United States Patent [19]

Itoh et al.

[11] Patent Number: 5,103,637

[45] Date of Patent: Apr. 14, 1992

[54] ROCKET ENGINE COMBUSTION CHAMBER

[75] Inventors: Takahiro Itoh; Morito Togawa, both of Nagoya; Masuo Okada, Neyagawa; Sowjun Matsumura, Toyonaka; Tadashi Chiba, Hirakata, all of Japan

[73] Assignees: Mitsubishi Heavy Industries, Ltd., Tokyo; Sawwabosei Co., Ltd.; C. Uyemura & Co., Ltd., both of Osaka, all of Japan

[21] Appl. No.: 602,640

[22] Filed: Oct. 24, 1990

[51] Int. Cl.$^5$ .............................. F02K 9/00
[52] U.S. Cl. ........................ 60/253; 428/610
[58] Field of Search ............ 60/253, 255; 428/610, 428/614

[56] References Cited

U.S. PATENT DOCUMENTS 5,038,561  8/1991  Chase .................... 60/253

Primary Examiner—Richard A. Bertsch
Assistant Examiner—Howard R. Richman

[57] ABSTRACT

A rocket engine combustion chamber is defined by a generally cylindrical member comprising a metal matrix and heat insulating particles wherein the particles are distributed in the matrix such that the amount of particles gradually decreases in a radial direction from the inner surface to the outer surface of the member. Such a member is manufactured by controlled composite electroplating.

7 Claims, 1 Drawing Sheet

ROCKET ENGINE COMBUSTION CHAMBER

This invention relates to a rocket engine combustion chamber and a method for manufacturing the same.

BACKGROUND OF THE INVENTION

In the prior art, rocket engine combustion chambers are manufactured by electroforming of nickel or the like. For rocket engine combustion chambers having a larger diameter, it is often practiced to apply a ceramic layer of zirconia, yttria or ceria, by spraying, to the inner surface of an electroformed nickel combustion chamber in order to increase strength and heat resistance. In operation, the rocket engine combustion chamber wall is cooled with the rocket propellant as a coolant (complete regenerative cooling) in order to protect the wall from propellant combustion gases at temperatures of from about 2,000° to 3,000° K. For increased cooling efficiency, cooling is done such that the coolant may not boil.

The combustion chambers formed from a metal such as nickel, however, suffer from several problems that not only an improvement in heat resistance of the combustion chamber is needed to accommodate the increased thermal flux from the combustion chamber inner surface due to increased heat transfer, but the wall thickness of the combustion chamber must be increased to alleviate thermal loads, both resulting in an increased size of cooling mechanism which is disadvantageous for weight reduction of the combustion/propulsion mechanism.

The ceramic layer sprayed to the inner surface of the combustion chamber has a durability problem associated with essentially poor adhesion between the ceramic layer and the combustion chamber-forming metal, typically nickel. A rapid temperature rise of the combustion chamber inner surface at the start of combustion of rocket propellant most frequently causes the sprayed ceramic layer to spall, eventually peeling off or cracking. Then the sprayed ceramic layer fails before fully exerting its thermal insulation and wear resistance against combustion gases exiting at a super high velocity.

For rocket engine combustion chambers having a smaller diameter, on the other hand, it is difficult to spray ceramic material to the inner surface of the combustion chamber. For the purpose of protecting the combustion chamber wall during combustion, the combustion chamber on the outer surface is cooled with the propellant as a coolant, and at the same time, part of the propellant is injected along the inner surface of the combustion chamber (partial regenerative cooling). This results in an increased loss of energy.

SUMMARY OF THE INVENTION

Therefore, it is an object of the present invention to provide a rocket engine combustion chamber which has improved wear resistance, heat resistance, durability, and cooling efficiency and requires a small size cooling mechanism, thus contributing to weight reduction of the overall combustion/propulsion mechanism. Another object of the present invention is to provide a method for manufacturing such a combustion chamber.

In a first aspect, the present invention provides a rocket engine combustion chamber having a generally cylindrical member having an outer surface and an inner surface defining the combustion chamber, the member comprising a metal matrix having heat insulating particles distributed therein uniformly in a direction generally parallel to the surfaces, but in a radial direction such that the amount of particles gradually decreases from the inner surface to the outer surface. The combustion chamber-defining member is provided with a radially graded distribution of heat insulating particles in the metal matrix.

In a second aspect, a rocket engine combustion chamber is manufactured by a method comprising the steps of: preparing a parent form having an outer surface which coincides with the inner configuration of the combustion chamber, dipping the parent form in a metal plating bath containing heat insulating particles dispersed therein where plating takes place, thereby forming a composite plating film having heat insulating particles dispersed in the plating metal matrix on the outer surface of the parent form, and removing the parent form and leaving the composite plating film which defines the combustion chamber. In order to achieve a graded distribution, the plating step is effected by controlling plating conditions or the amount of insulating particles in the bath such that the amount of insulating particles codeposited in the composite plating film is gradually reduced.

The rocket engine combustion chamber is defined by a member having heat insulating particles dispersed in a metal matrix. The heat insulating particles are distributed in the metal matrix uniformly in a direction generally parallel to the surfaces, but non-uniformly in a radial direction such that the amount of particles gradually decreases from the inner surface to the outer surface. The member has a graded distribution of particles in this sense. The heat insulating particles function to shield high temperatures near the inner surface while heat is transferred to the coolant through the heat conducting metal matrix surrounding the particles. The heat insulating particles can serve for heat insulation without interfering the heat transfer of the metal matrix, thereby preventing the propellant used as the coolant from boiling and thus improving cooling efficiency.

In addition, heat insulating material is codeposited in the metal matrix to form an integral or composite member defining the combustion chamber. This integral member can prevent any peeling or cracking of the insulating material caused by a rapid temperature rise of the combustion chamber inner surface at the start of combustion of propellant and is more wear resistant and durable against combustion gases ejected at super high velocity.

If a combustion chamber-defining member does not possess a graded distribution, but a rapidly changed distribution, for example, if it is a laminate of a layer having a substantial amount of heat insulating particles dispersed therein and a layer having no heat insulating particles stacked thereon, the laminate layers are quite different in strength, mechanical properties and heat resistance, and more particularly, these physical values drastically change at the interface across which the amount of heat insulating particles dispersed rapidly changes, resulting in mechanical and thermal stresses concentrating at the interface. Then such a member cannot withstand the super high velocity combustion gases of the rocket engine and is likely to crack, failing to ensure thermal insulation and cooling. In contrast, the member of the invention has the graded distribution that the amount of heat insulating particles is gradually reduced from the inner surface toward the outer surface, which ensures that physical properties including strength, mechanical properties and heat resistance gradually change from the inner surface toward the outer surface, avoiding localized concentration of mechanical and thermal stresses. Therefore, the combustion chamber of the invention has an improved self-sustaining function in that it ensures thermal insulation and cooling while accommodating combustion gases within its confine.

The combustion chamber of the invention defined by a member of a metal matrix having heat insulating particles integrally dispersed therein in a radially graded distribution ensures efficient cooling and provides sufficient thermal insulation even with a reduced wall thickness. The combustion chamber-defining member of reduced wall thickness has a reduced weight and requires a smaller size cooling mechanism, resulting in an overall combustion/propulsion mechanism being reduced in weight. Efficient cooling with suppressed boiling of the coolant and sufficient thermal insulation eliminate the need for injecting the propellant along the inner surface of the combustion chamber. The invention is advantageously applicable to a combustion chamber of a smaller diameter.

The method of the present invention can change the quantity of heat insulating particles codeposited in a plating film by controlling plating conditions of a plating bath having heat insulating particles dispersed therein, including plating bath composition, pH, cathode current density, agitation and temperature or by controlling the quantity of heat insulating particles dispersed in the plating bath. By gradually varying the plating conditions or the dispersed particle quantity, a plating film having a graded distribution as mentioned above is manufactured in an easy and steady manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features, and advantages of the present invention will be better understood from the following description taken in conjunction with the accompanying drawings, drawings which are given by way of illustration only, and thus are not limitative of the present invention, and in which.

Like parts are designated by the same reference numerals throughout the figures.

DESCRIPTION OF THE PREFERRED EMBODIMENTS

Figure 1:
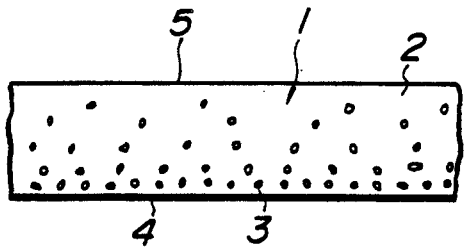
FIG. 1 is a schematic cross section of a member defining a combustion chamber according to the present invention.

The rocket engine combustion chamber of the present invention has a generally cylindrical member, a fragment of which is shown in FIG. 1 at 1 as having an inner surface 4 defining the combustion chamber and an outer surface 5. The member 1 is formed of a metal matrix 2 having heat insulating particles 3 dispersed therein. The particles 3 are distributed uniformly in a direction generally parallel to the surfaces 4 and 5, but non-uniformly in a radial direction such that the amount of particles gradually decreases from the inner surface 4 to the outer surface 5.

The metal matrix used herein includes a variety of metals and their alloys, typically nickel and nickel alloys such as Ni-P, Ni-B, Ni-Co, and Ni-Fe, copper and copper alloys such as Cu-Zn and Cu-Zn-Sn, and iron and iron alloys. Nickel and its alloys are most preferred for strength, heat resistance, heat conduction and cost.

The heat insulating particles may be either organic or inorganic, but those which can withstand high temperatures of from 1,000° to 3,500° C. are preferred. Inorganic particles of zirconia, yttria, ceria, silica, alumina, titania, and mullite are preferably used for heat insulation, strength, heat resistance, and cost, with the zirconia, silica and yttria being most preferred.

The heat insulating particles may have a varying particle size, but preferably a mean particle size of from 0.5 to 30 μm, more preferably from 1 to 10 μm, most preferably from 3 to 8 μm. Since the amount of particles codeposited is reduced with too fine or too coarse particles, it is sometimes difficult to control the amount of particles codeposited, failing to provide a graded distribution.

The combustion chamber-defining member may have a varying thickness, but generally a radial thickness of from 2 to 20 mm, preferably from 4 to 10 mm.

The member has a graded distribution of particles such that the amount of particles gradually decreases from the inner surface 4 to the outer surface 5. Preferably, the amount of particles distributed is 20 to 40% by volume, especially 25 to 35% by volume adjacent to the inner surface, namely in an area of 0 to about 2 mm from the inner surface, 10 to 30% by volume, especially 15 to 25% by volume midway, namely in an area of about 1 mm to about 4 mm from the inner surface, and 0 to 10% by volume, especially 0 to 5% by volume near the outer surface, namely in an area of more than about 2 mm from the inner surface. Thermal insulation would become less sufficient in some cases if the amounts of particles dispersed adjacent the inner surface and midway are less than 20% and 10% by volume, respectively. The member would become rather weak and less durable in some cases if the amounts of particles dispersed adjacent the inner surface and midway are more than 40% and 30% by volume, respectively. For strength and durability, the amount of particles dispersed need not exceed 10% by volume in an outer area near the outer surface.

It is to be noted that the graded distribution includes continuous gradation and stepwise gradation, provided that the stepwise gradation does not adversely affect the integrity of the member.

The rocket engine combustion chamber of the invention can be manufactured by a plating process in an efficient manner. More particularly, the combustion chamber is manufactured using a plating process, by preparing a parent form having an outer surface which coincides with the inner configuration of the combustion chamber from a metal such as aluminum; dipping the parent form in a metal plating bath containing heat insulating particles dispersed therein where plating takes place, thereby forming a composite plating film having heat insulating particles dispersed in the plating metal matrix on the outer surface of the parent form; and removing the parent form and obtaining the composite plating film which defines the combustion chamber. The plating step is effected by controlling plating conditions and the amount of insulating particles in the bath so as to achieve the graded distribution that the amount of insulating particles codeposited in the composite plating film is gradually reduced.

The metal plating bath is a plating bath of the metal which is selected as the metal matrix of the combustion chamber-defining member. Such a plating bath may be any well known plating bath, for example, nickel electroplating baths including sulfamate bath, Watts bath, high nickel sulfate bath, and high chloride bath. For example, a Watts bath of the following composition may be used.

| $NiSO_4 \cdot 6H_2O$ | 200–400 g/l |
|---|---|
| $NiCl_2 \cdot 6H_2O$ | 30–60 g/l |
| $H_3BO_3$ | 30–50 g/l |
| Anti-pitting agent | 0.5–1 g/l |
| | pH 3–5 |

Also useful is a sulfamate bath of the following composition.

| Nickel sulfamate | 150–600 g/l |
|---|---|
| Nickel chloride | 10–50 g/l |
| Boric acid | 30–50 g/l |
| | pH 3–5 |

In practice, the combustion chamber-defining member may be manufactured either by a single-step plating process using a single bath or by a multi-step plating process using two or more baths. Typically, the multi-step plating process includes a primary electroforming step of forming a part of the member by plating in a first bath and a secondary electroforming step of forming the remaining part thereon by plating in a second different bath. In the multi-step plating process, for reducing electrodepositing stresses and increasing tensile strength, it is recommended to use a sulfamic acid bath as the first bath and a sulfate base bath as the second bath. When different baths are used, they should preferably be baths of the same metal to provide integrity of the metal matrix of the member.

The amount of heat insulating particles dispersed in the plating bath may vary over the range of from 0 to 1,000 grams/liter. With the remaining conditions kept identical, the amount of particles codeposited increases with the amount of particles dispersed. Therefore, a plating film having a graded distribution can be formed by providing a plurality of plating baths of the same type, but having different amounts of particles dispersed, and effecting consecutive plating from bath to bath.

In addition to the variation of the amount of heat insulating particles dispersed in plating baths, a plating film having a graded distribution can be prepared by varying plating conditions.

The amount of heat insulating particles codeposited is discussed with respect to various parameters. In general, the amount of heat insulating particles codeposited is larger with a sulfamic acid bath than a sulfate bath. Usually, the plating bath contains a nonionic surface active agent, an anionic surface active agent or a cationic surface active agent in an amount of 0.0001 to 1 gram/liter, especially 0.01 to 0.1 gram/liter. The amount of heat insulating particles codeposited is increased in the order of anionic, nonionic and cationic surface active agents and in proportion of the amount of surface active agent added. Any conventionally used active agents may be used herein although hydrocarbon and fluoroalkyl surface active agent are preferred to increase the codeposition amount. Also, sodium lauryl sulfate is preferably added in an amount of 0.5 to 1 gram/liter in order to prevent pitting in the plating film.

By adding a primary brightener such as organic sulfimides and a secondary brightener such as acetylene alcohols in amounts of 0.5 to 20 grams/liter as often used in well-known nickel plating bath, the softness and appearance of a plating film can be improved.

The pH of plating bath may be in the commonly used range depending on the type of bath. For example, nickel electroplating baths are generally adjusted to pH 3.5–4.5. The amount of heat insulating particles codeposited increases with a lowering of pH. Where sulfamic acid and sulfate baths are used in the primary and secondary electroforming steps as previously described, the primary and secondary baths are preferably adjusted to pH 3.5–4.5 and pH 4.0.–4.5, respectively, in order to form a pit-free soft plating film.

In carrying out electroplating, the cathodic current density may vary over the range of from 0.5 to 10 $A/dm^2$. In general, the amount of particles codeposited increases with a lowering of current density. The plating bath may be agitated by mechanical agitation, pumping, aeration, cathode rocking or the like, with mechanical agitation being preferred. In general, the amount of particles codeposited increases with more vigorous agitation. Therefore, in propeller agitation as one example of mechanical agitation, the propeller is rotated at 50 to 2,500 r.p.m. In pumping, the plating solution is circulated at a rate of 10 to 100 cycles per hour. In aeration, air is bubbled at a rate of 0.5 to 30 $m^3/m^2/min$. In cathode rocking, the cathode may be reciprocated at an amplitude of 0.5 to 200 cm and 0.5 to 150 cycles/min. In any case, such vigorous agitation can increase the amount of particles codeposited.

Control of cathodic current density and/or degree of agitation provides a continuous mode of control without changing the plating bath composition and is advantageous for controlling the amount of particles codeposited.

The plating temperature is generally adjusted to the range of from 30° to 60° C. in order to form a soft plating film with minimal electrodepositing stresses. Since the amount of particles codeposited increases with higher temperatures, it is also possible to vary the plating temperature to control the amount of particles codeposited.

The plating time generally ranges from about 1 hour to about 2,000 hours although it depends on the desired thickness of the combustion chamber-defining member.

After a plating film having a graded distribution is formed, the parent form is removed by any desired method, for example, by dipping in an alkaline solution if the form is of aluminum. There is obtained a member having a cross section as shown in FIG. 1.

The combustion chamber-defining member may be provided with one or more channels for coolant passage if needed. For example, coolant channels may be formed in the outer surface of the plated film at the end of electroforming by machining or the like. Alternatively, internal coolant channels may be formed through the plated film. One advantageous process for providing such internal coolant channels is by machining channels on the outer surface of a first layer at the end of primary electroforming, filling the channels with wax for masking purposes, effecting secondary electroforming on the first layer, and finally removing the masking material from the channels.

EXAMPLE

Examples of the present invention are given below by way of illustration and not by way of limitation.

EXAMPLE

Figure 2:
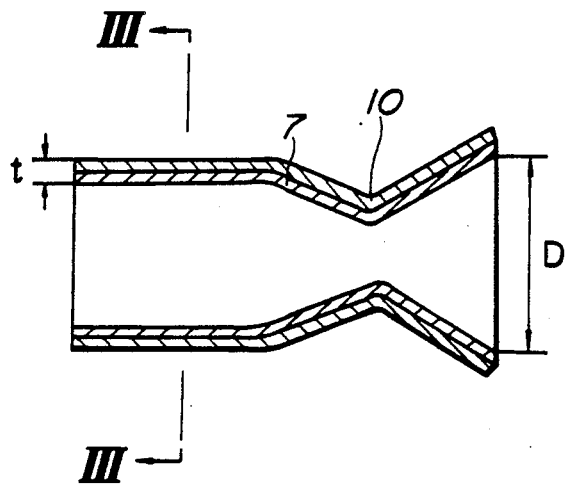
FIG. 2 is an axial cross section of a combustion chamber according to one embodiment of the invention.
Figure 3:
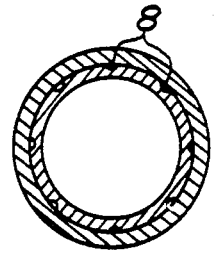
FIG. 3 is a transverse cross section taken along lines III—III in FIG. 2.

A combustion chamber was fabricated. A generally cylindrical member having a radial wall thickness t of about 6 mm and an inner diameter D of 80 mm at one end as shown in FIGS. 2 and 3 was manufactured as follows using nickel as the metal matrix and zirconia particles as the heat insulating particles.

Figure 4:
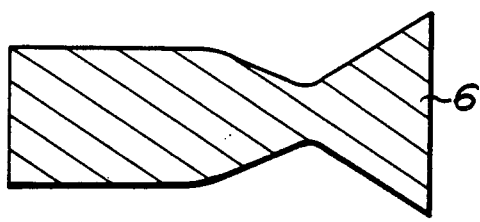
FIGS. 4 to 6 illustrate a method for manufacturing the combustion chamber of the embodiment of FIGS. 2 and 3, FIG. 4 being an axial cross section of a parent form, FIG. 5 being an axial cross section of the parent form after primary electroforming, and FIG. 6 being a transverse cross section of the parent form after secondary electroforming.

First, a parent form was formed from aluminum. As shown in FIG. 4, the parent form 6 was of generally cylindrical shape having a diameter of 80 mm at the right end in the figure.

The parent form was pretreated by a conventional procedure and dipped in a nickel electroplating bath having zirconia particles dispersed therein of the following composition where composite plating was effected under the following conditions.

| Plating bath | |
|---|---|
| $NiSO_4.6H_2O$ | 320 g/l |
| $NiCl_2.6H_2O$ | 40 g/l |
| $H_3BO_3$ | 35 g/l |
| Pit suppressor | 0.8 g/l |
| Zirconia particles (size 1 μm) | 400 g/l |
| | pH 4.2 |

| Plating conditions | |
|---|---|
| Plating time | 1,620 min. |
| Cathodic current density | |
| 0 → 120 min. | 0.5 $A/dm^2$ |
| 120 → 1500 min. | 1.5 $A/dm^2$ |
| Temperature | 45° C. |
| Aeration | 100 l/min. |

Figure 5:
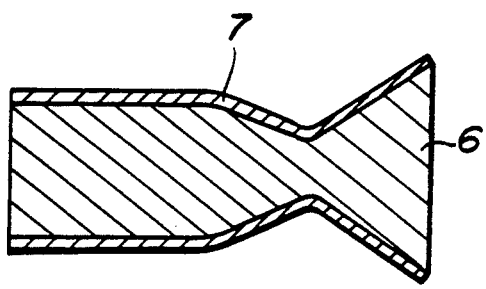

As a result of this plating (primary electroforming), a composite nickel plating layer 7 having zirconia particles codeposited therewith was deposited on the parent form 6 as shown in FIG. 5. The layer 7 had a thickness of 0.7 mm. The plating layer 7 had a graded distribution that the amount of zirconia particles codeposited therein decreased from the inner surface toward the outer surface.

| Distance from the inner surface | $ZrO_2$ particles |
|---|---|
| 0.01 mm | 30% by volume |
| 0.7 mm | 7% by volume |

Figure 6:
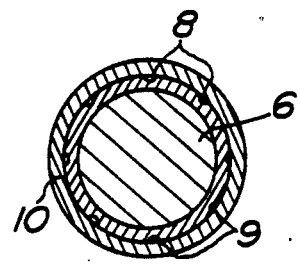

Next, as shown in FIG. 6, the composite nickel plating layer 7 on the outer surface was provided with a plurality of, eight in FIG. 6, axially extending channels 8 by machining. Wax 9 was filled in the channels 8 for masking. Then nickel plating was again conducted on the plating layer 7 using a nickel electroplating bath of the following composition.

| Plating bath | |
|---|---|
| $NiSO_4.6H_2O$ | 320 g/l |
| $NiCl_2.CH_2O$ | 40 g/l |
| $H_3BO_3$ | 35 g/l |
| Anti-pitting agent | 0.8 g/l |
| | pH 4.2 |

| Plating conditions | |
|---|---|
| Plating time | 17,000 min. |
| Cathodic current density | 2.3 $A/dm^2$ |
| Temperature | 40° C. |
| Aeration | weak |

As a result of this plating (secondary electroforming), a nickel plating layer 10 was deposited on the composite plating layer 7 as shown in FIG. 6. The layer 10 had a thickness of 8 mm and contained no codeposition zirconia particles. Then, the parent form 6 of aluminum was removed by dissolving in an alkali solution and the wax filling 9 was removed from the channels 8. There was obtained a generally cylindrical member as shown in FIGS. 2 and 3.

For the purpose of illustration only, the member is shown in FIGS. 2 and 3 as a distinct dual layer structure comprising the composite layer 7 by primary electroforming and the overlying layer 10 by secondary electroforming. Since both the matrices of the composite layer 7 and the overlying layer 10 are nickel, both the layers 7 and 10 are perfectly integrated together so that the interface which is depicted in the figures does not appear in practice.

Since the composite layer 7 by primary electroforming had a graded distribution of zirconia particles codeposited therein and the overlying layer 10 by secondary electroforming had 0% of zirconia particles, the resulting member as a whole had a graded distribution that the amount of zirconia particles gradually decreased from the inner surface toward the outer surface. In the member, the channels 8 provide coolant passageways.

The thermal performance of the combustion chamber-defining member was examined, with the results shown in Table 1. In Table 1, the thermal performance of a conventional member manufactured simply by nickel electroforming is also shown for comparison purposes.

TABLE 1

| | Invention | | | Prior art |
|---|---|---|---|---|
| | near inner surface | near coolant channel | near outer surface | (nickel electroforming) |
| $ZrO_2$ | | | | |
| particle size | 5 μm | 1 μm | — | — |
| codeposition | 30 vol % | 7 vol % | 0 vol % | 0 vol % |
| Specific heat $J/g \cdot °C.$ | 0.51 | 0.52 | 0.51 | 0.51 |
| Thermal diffusivity $cm^2/s$ | 0.08 | 0.12 | 0.12 | 0.12 |
| Thermal conductivity $J/cm \cdot s \cdot °C.$ | 0.34 | 0.54 | 0.56 | 0.56 |

As seen from Table 1, the combustion chamber-defining member according to the invention could reduce the thermal conductivity at the inner surface to about 60% of that of the prior art electroformed nickel member, thus providing effective thermal insulation against high temperatures of about 500° C. to which the combustion chamber inner surface is normally exposed during operation.

In the case of a combustion chamber in which a zirconia layer of 2 mm was sprayed to the inner surface of the prior art electroformed nickel member, the sprayed zirconia layer tended to peel away immediately after fuel injection. In contrast, the composite member having zirconia particles dispersed in nickel matrix according to the invention experienced neither delamination nor zirconia particle dropping and remained unchanged in actual combustion tests, indicating improved thermal shock resistance upon fuel injection.

The rocket engine combustion chamber of the present invention has the following benefits. The method of the invention can manufacture such a combustion chamber in a simple and efficient manner.

(a) Because of the graded distribution that the amount of heat insulating particles dispersed in metal matrix is maximum at the inner surface and continuously decreases toward the outer surface, the combustion chamber at its inner surface provides satisfactory thermal insulation against a rapid temperature rise at the start of burning of propellant without cracking or particle fall.

(b) Thermal insulation is impaired to the combustion chamber without sacrificing the heat conduction of metal matrix, thereby preventing the propellant used as coolant from boiling, eventually increasing cooling efficiency.

(c) Since increased thermal insulation is achieved while insuring satisfactory cooling efficiency, the combustion chamber-defining member can be reduced in thickness and hence, in weight and thus requires a smaller size of cooling means, contributing to weight reduction of an overall combustion/propulsion mechanism.

(d) Prevention of coolant boiling provides more efficient cooling, which eliminates the need for injecting the propellant along the inner surface of the combustion chamber, thus eliminating energy loss. The invention is applicable to a combustion chamber of a smaller diameter in this sense.

(e) The graded distribution that the amount of heat insulating particles codeposited in metal matrix is maximum at the inner surface and continuously decreases toward the outer surface provides the member with high strength and high wear resistance against combustion gases ejected at super high velocity so that the member is fully durable.

Although some preferred embodiments have been described, many modifications and variations may be made thereto in the light of the above teachings. It is therefore to be understood that within the scope of the appended claims, the invention may be practiced otherwise than as specifically described.

We claim:

1. A rocket engine combustion chamber having a generally cylindrical member having an outer surface and an inner surface defining the combustion chamber, said member comprising a metal matrix having heat insulating particles distributed therein uniformly in a direction generally parallel to the surfaces, but in a radial direction such that the amount of particles gradually decreases from the inner surface to the outer surface.

2. The chamber of claim 1 wherein the metal matrix is selected from nickel and nickel alloys.

3. The chamber of claim 1 wherein the particles are selected from inorganic particles of zirconia, yttria, ceria, silica, alumina, titania, and mullite.

4. The chamber of claim 3 wherein the particles have a mean particle size of 0.5 to 30 $\mu$m.

5. The chamber of claim 1 wherein the particles are distributed in an amount of 20 to 40% by volume adjacent to the inner surface, 10 to 30% by volume midway and 0 to 10% by volume near the outer surface.

6. The chamber of claim 1 wherein the member has a radial thickness of 2 to 20 mm.

7. The chamber of claim 1 wherein the amount of particles continuously decreases from the inner surface to the outer surface.

* * * * *